United States Patent [19]

Francis

[11] Patent Number: 4,903,831

[45] Date of Patent: Feb. 27, 1990

[54] AUTOMATIC NAILER SYSTEM

[76] Inventor: Terry E. Francis, Poplar Court, Cae Hopkin, Abercrave, Powys SA9 1TP, Wales

[21] Appl. No.: 247,678

[22] Filed: Sep. 22, 1988

Related U.S. Application Data

[60] Division of Ser. No. 97,512, Sep. 15, 1987, Pat. No. 4,795,074, which is a continuation-in-part of Ser. No. 766,107, Aug. 15, 1985, abandoned.

[30] Foreign Application Priority Data

Aug. 15, 1984 [GB] United Kingdom ................. 8420747
May 14, 1985 [GB] United Kingdom ................. 8512208

[51] Int. Cl.⁴ ........................ B65D 85/24; F16B 41/00
[52] U.S. Cl. .................................... 206/347; 206/338; 411/541; 411/908; 52/512
[58] Field of Search ............... 206/347, 338, 343, 345; 411/480, 531, 542, 546, 908; 52/512, 410

[56] References Cited

U.S. PATENT DOCUMENTS

| | | | |
|---|---|---|---|
| 2,354,506 | 7/1944 | Doke | 411/546 |
| 2,784,405 | 3/1957 | Working, Jr. | 206/347 |
| 2,909,781 | 10/1959 | Ollig et al. | 206/343 |
| 3,165,968 | 1/1965 | Anstett | 206/343 |
| 3,211,284 | 10/1965 | Anstett | 206/347 |
| 3,693,220 | 9/1972 | Pabich et al. | 206/343 |
| 4,106,618 | 8/1978 | Haytayan | 206/347 |
| 4,106,619 | 8/1978 | Haytayan | 206/346 |
| 4,121,715 | 10/1978 | Hodil, Jr. | 206/347 |
| 4,298,121 | 11/1981 | Oide et al. | 206/347 |

*Primary Examiner*—Stephen Marcus
*Assistant Examiner*—D. Jenny
*Attorney, Agent, or Firm*—Leydig, Voit & Mayer

[57] ABSTRACT

The present invention provides an automatic nailer system for use in the joinery industry. The system includes a strip including a plurality of plastic ferrules which receive a complementary plurality of nails. Each ferrule is provided with a step which is adapted to cooperate with a surface of a substrate to form a groove for receiving a flange on a trim, each ferrule also having the thicker part thereof tapered to assist in fitting the trim. The ferrules are arranged in a longitudinal row and are connected to each other by at least one severable plastic web. The system further includes an automatic nailer specially adapted to drive the nails individually into a substrate while at the same time severing its associated ferrule from the next adjacent ferrule. Preferably, the automatic nailer includes a cartridge for feeding a plurality of strips into the automatic nailer.

8 Claims, 7 Drawing Sheets

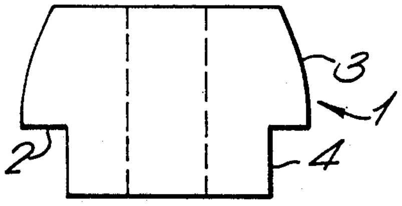
FIG. 1.
PRIOR ART
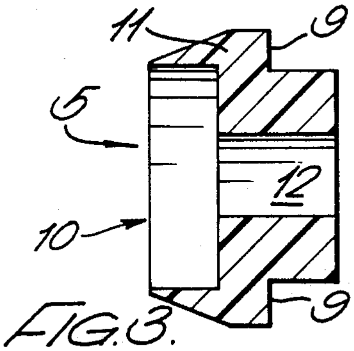
FIG. 3.
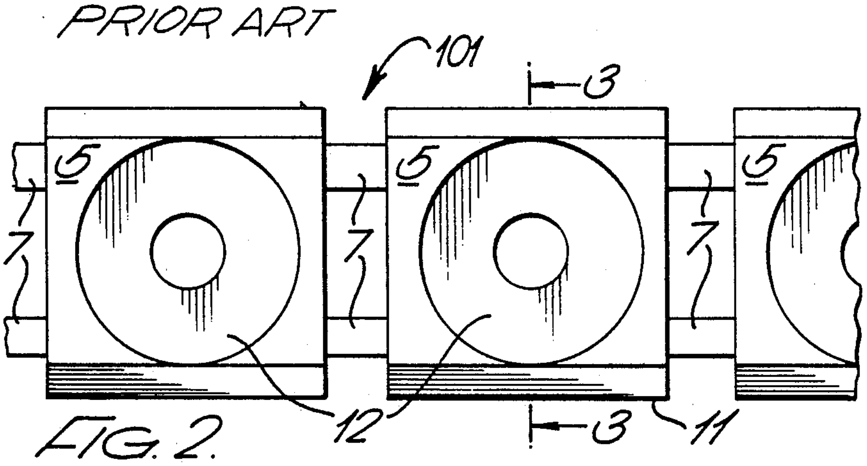
FIG. 2.
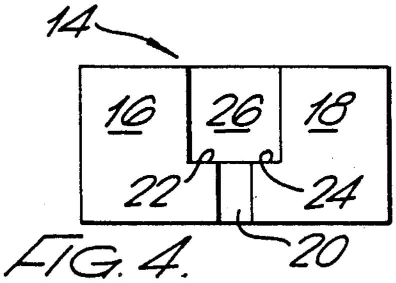
FIG. 4.
FIG. 5.
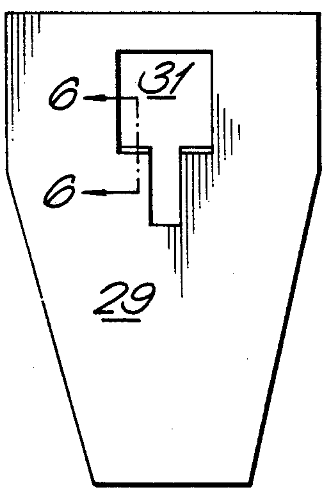
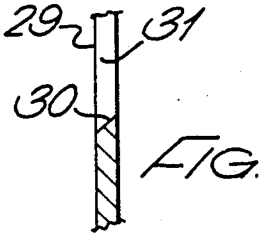
FIG. 6.

FIG. 12
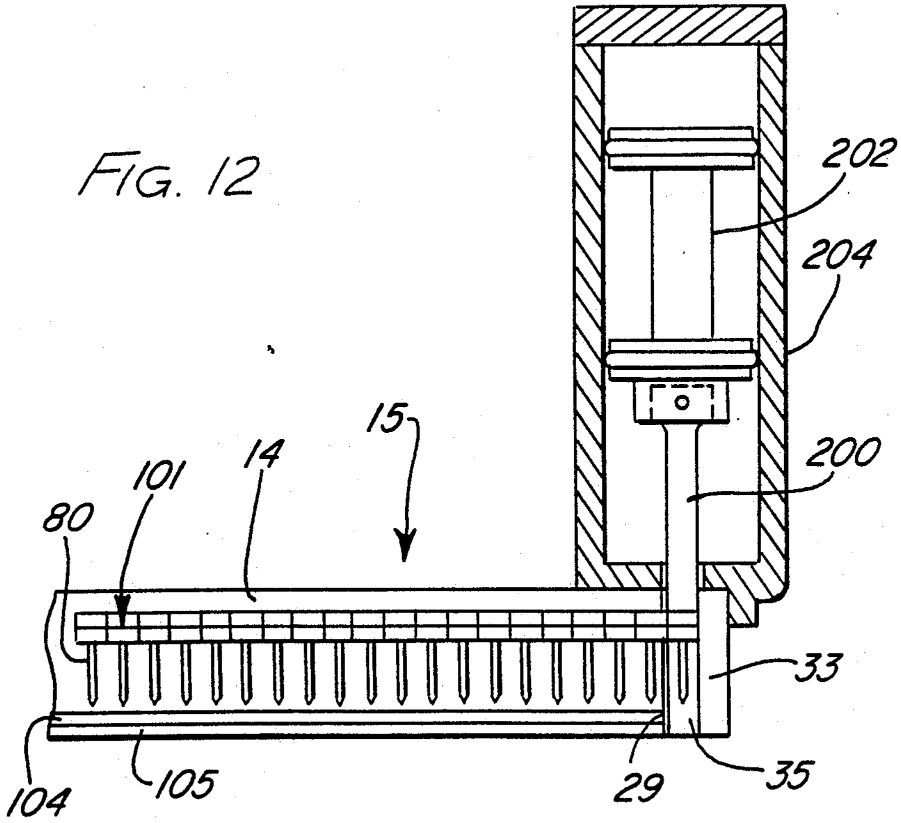
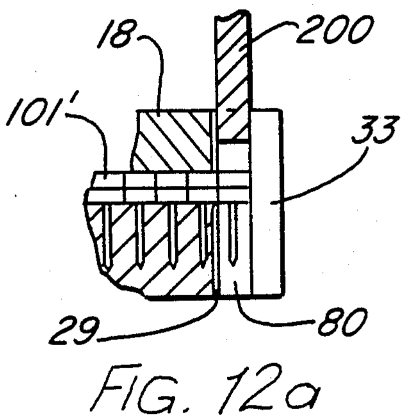
FIG. 12a
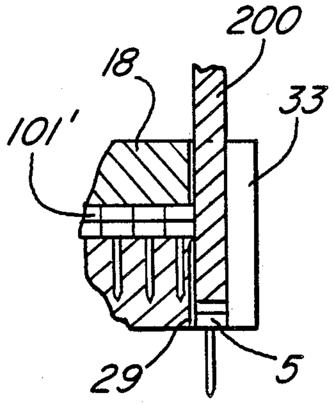
FIG. 12b

AUTOMATIC NAILER SYSTEM

CROSS REFERENCE TO RELATED APPLICATION

This is a divisional of application Ser. No. 097,512, filed Sept. 15, 1987, now U.S. Pat. No. 4,795,074, which is a continuation-in-part of U.S. Ser. No. 766,107, filed Aug. 15, 1985, entitled AUTOMATIC NAILER SYSTEM, now abandoned.

BACKGROUND OF THE INVENTION

The present invention relates to an automatic nailer system particularly, but not exclusively, for use in the joinery industry.

In manufacturing items of joinery such as doors and cupboards, it is common practice nowadays to provide a molded plastic trim to cover over the joints between the sections of the item, or for general decoration of finished chip-board furniture. For instance, a door may comprise a central chipboard panel located in grooves in a surrounding softwood frame. To cover the grooves and the joints between the panel and frame, a generally triangular molded plastic trim is fitted onto the door at the periphery of the panel.

In one method of fitting the trim, a number of metal ferrules are nailed, at predetermined spacings, onto the panel and the frame. A typical prior art ferrule is shown in FIG. 1 of the accompanying drawings to which reference is now made. Each ferrule 1 is generally cylindrical and has a step 2 at approximately its midpoint. The thicker portion 3 tapers from the step 2 towards the end. Each ferrule is fixed by a nail passing through hole 6 so that the end of the thinner portion 4 of the ferrule abuts the panel or frame, thereby forming a groove comprising the panel or frame, the cylindrical side of the thinner portion 4 of the ferrule 1 and the bottom of the step 2. A flange provided on the inside of the trim is clipped into the groove to retain the trim in place.

In order to ensure that the trim fits properly on the door, it is necessary to ensure that the ferrules are correctly aligned with one another. At present, this is achieved by an operator firstly manually marking out, for instance with a bradawl, the position at which each ferrule is to be located and then manually hammering a nail through the ferrule into the marked position. As the nails and, in particular, the ferrules are small (each ferrule is generally about 4 mm long and at maximum 5 mm in diameter) this is a delicate task and therefore cannot be carried out quickly even by a skilled worker. Moreover, as any given door will usually have a minimum of twenty-four ferrules, the time taken to fit the ferrules properly on the door will be considerable.

Moreover, since the nails are driven manually, they are not always accurately aligned with the markings. Thus, when the trim is fitted, it often is not straight, and a further operation needs to be carried out to bend the nails so that the trim can be located properly on the door.

This method of fitting trim is therefore disadvantageous in that it is labor intensive, slow and not always accurate. However, it has the advantage that the trim is positively and permanently located on the door.

There has therefore been a trend in recent years to the use of double-sided adhesive tape for locating the trim on a door. This speeds up the process for fitting the trim, since it is only necessary to strip the protective cover from the adhesive tape and lay a length of trim adjacent a template. This also gives a more accurate location of the trim. However, this process is disadvantageous because it increases substantially the cost of the trim, since the trim is solid and has on it the double-sided adhesive tape, and does not lead to a permanent fixture of the trim, since the adhesive effect of the tape can be readily overcome by adverse atmospheric conditions, such as bright sunlight, aging or physical force.

Therefore, at present, there is not a fully satisfactory method for attaching trim to a door or similar item of joinery.

There are presently commercially available a number of automatic nailers, such as those supplied by Spot Nails Limited of Cardiff, Wales, United Kingdom. These nailers work in a similar fashion to stapling machines and comprise a track having an elongate opening along which a strip of nails is urged by a spring bias, and a piston driven hammer which drives the end one of the strip of nails into a substrate. The nails are held in the form of a strip either by a flexible lacquer coating (similar to the coating used to hold a strip of staples together) for small nails with a small or no head, or by a flexible strip of adhesive paper or plastic for larger nails with a substantial, generally T-shaped head.

It has not hitherto been possible to use an automatic nailer to fix ferrules to door frames or panels since it has not been possible to align the ferrule and the nail sufficiently well to ensure that the ferrule will correctly receive the nail as it is being hammered into the substrate. This could lead to damage to the ferrule, the automatic nailer and/or the substrate. Moreover, with the larger nails, the paper or plastic strip is driven with the nail and may interfere with the correct orientation of the ferrule on the substrate.

The present invention enables ferrules to be fixed onto an item of joinery automatically, thereby overcoming at least in part the problems of the present manual methods and of the inability to use automatic nailers for this purpose.

SUMMARY OF THE INVENTION

According to a first aspect of the present invention, there is provided a strip for use with an automatic nailer comprising a plurality of plastic ferrules, arranged in a longitudinal row, for receiving a complementary plurality of nails, each ferrule being attached to adjacent ferrules by at least one severable plastic web.

Preferably, the strip is provided with the nails already in place in the ferrules. The nails may be removably located in the ferrules, but are advantageously fixedly located in the ferrules. A strip according to the invention having the nails already in place is hereinafter referred to as a 'nailed strip'.

Although it is presently envisaged that the invention will be particularly useful in connection with ordinary joinery nails, such as panel pins, tacks, oval head nails and T-head nails, it is clearly also applicable to other fastening means which are driven in by hammering, rather than by screwing, such as masonry pins, expansion bolts and expanding nails. In the present specification 'nails' is to be taken to include all these fixing means except where otherwise specified.

Preferably, the ferrules are arranged in a rectilinear row, but for some designs of nailers it may be necessary to arrange them in a curvilinear row, depending on the shape of the track in the automatic nailer.

Each ferrule may be generally cylindrical, as with presently used ferrules, with the cylindrical axis perpendicular to the longitudinal axis of the strip. Alternatively each ferrule is generally square or rectangular in plan, with a central axial hole for receiving the nail.

Preferably, the ferrules and the webs are formed around the heads of the nails in a molding operation to form a complete nailed strip. However, alternatively, the ferrules and the webs may be formed by machining a formed strip of plastic and the nails may be located or fixed therein in a subsequent operation.

Advantageously, each ferrule is formed so that it provides a means whereby a trim can be fixed onto a substrate onto which the ferrule has been attached. Preferably, each ferrule is formed with a step in it so that a groove is formed for receiving a flange on the trim, as with presently used ferrules. In this case the thicker part of the ferrule is conveniently tapered to assist in fitting the trim. Alternatively, the ferrule may be provided with holes or lugs for receiving lugs or for fitting into holes respectively on the trim.

Preferably, the ferrules and web are made from a relatively hard plastic, such as polyamide or polypropylene. An especially preferred plastic is Nylon A100 supplied by Warden Plastic Ltd. of Luton, Bedfordshire, United Kingdom.

Advantageously, the webs are relatively inflexible so that the individual parts of the strip are fed in the correct orientation through the nailer. In one embodiment of the invention, there is only one web between each pair of adjacent ferrules, the web being located on the longitudinal axis of the cartridge. However, in this arrangement, it may be difficult for the strip to be cut cleanly and to clear cut material from the machine using the strip. Therefore, in an alternate preferred embodiment, there are two such webs, one located on either side of the longitudinal axis. Other arrangements for the web(s) will be apparent to those skilled in the art.

According to a second aspect of the present invention, there is provided an automatic nailer for receiving a nailed strip and for fixing ferrules severed from the strip to a substrate, the automatic nailer comprising:

a track, for supporting the nailed strip, having therein an elongate opening for receiving the portions of the nails depending from the ferrules;

means for urging the nailed strip along the track;

a guide plate having a generally T-shaped slot therein located at the end of the track towards which the nailed strip is, in use, urged, the slot being arranged to allow therethrough a ferrule and its associated nail;

a stop block having in it an elongate recess having a cross-sectional shape which receives snugly a ferrule, the stop block being located adjacent the guide plate with its recess parallel to the leg of the T-shaped slot so that only one ferrule and its associated nail can, in use, extend beyond the guide plate; and a reciprocable hammer for driving the nail and the ferrule in the recess towards the substrate and causing the ferrule to be severed from the next adjacent ferrule.

Preferably, the guide plate and the recess in the stop block are at least twice as long as the nail to be driven so that the nail is guided towards the substrate for at least the majority of its length of movement.

Preferably, the bottom edges of the arms of the T-shaped slot are sharpened to assist in severing the ferrule in the recess from the next adjacent ferrule.

Preferably, at least part of one side of the track is formed by an edge of a cartridge of the type described below, whereby a plurality of nailed strips can be fed into the automatic nailer. In such a case the automatic nailer will need to be provided with means for receiving the cartridge, such as openings, platforms, or the like.

Clearly, the exact shape of the track, T-shaped slot, and recess will be dependent on the shape of the ferrule and length of the nail used in the nailed strip. Preferably, the track also has in it a shallow groove on either side of the opening in which the ferrules are located.

The means for urging the nailed strip along the track may comprise a spring bias, for instance of the type used in conventional stapling machines. However, it has been found that, under some circumstances, use of a spring bias will cause the nailed strip to buckle, thereby causing the ferrule in the stop block to become misaligned, possibly leading to jamming of the automatic nailer.

Therefore, preferably, the urging means is a gear driven by a low power motor, for instance a pneumatic motor, the gear being arranged to mesh with the nails depending from the nailed strip to move it towards the stop block. The gear is driven by a low power motor so that when there is a ferrule in the stop block, the reaction of the nail on the gear causes the motor to stall, thereby preventing to a substantial extent any buckling of the nailed strip.

The gear is preferably a worm gear located parallel to the track. However, the gear may alternatively be a pinion gear which uses the nails in the strip as a rack.

Preferably, the automatic nailer has on it a plate normal to the recess in the stop block for location on the substrate which is to receive the nails, and having a hole in it for passage therethrough of a nail ferrule. The plate can be used to ensure that the nailer is correctly located on the substrate so that the nails are accurately driven into the substrate.

It has been found that, for production reasons, it is not possible to mold strips having more than about 25 or 30 ferrules in them. Moreover, if the strip is longer than this, it becomes difficult to handle. Also, it is not possible to curve the strips to any significant extent to produce a spiral strip of substantial length without damaging the webs, thus making it difficult to feed the strip into the automatic nailer.

Therefore, according to a further aspect of the present invention, there is provided a cartridge for feeding a plurality of nailed strips into an automatic nailer according to the invention comprising:

a plurality of parallel ribs for receiving thereon a plurality of nailed strips with the strips arranged transverse to the ribs and the nails depending into the spaces between the ribs;

means for urging the nailed strips in a direction parallel to the ribs;

the edge of the cartridge, towards which the urging means, in use, urges the strips, having apertures, for passage therethrough of the nails, and being shaped so as to form, in use, at least part of one side of the track for the automatic nailer; and alignment means for locating the cartridge with its apertured edge aligned with the other side of the track in the automatic nailer.

Preferably, the cartridge is made as a molded plastic item, for instance of polypropylene or polyamide. The ribs will be of such a width that the nailed strips can be located thereon without the nails engaging the ribs.

The means for urging may comprise a spring bias, but the action of this can in some circumstances cause the strips to become misaligned in the cartridge, thereby interfering with their feeding into the nailer.

It is therefore preferred that the means for urging is also a gear, preferably a worm gear, driven by a low power motor, such as a pneumatic motor. The worm gear is preferably located on the nailer.

Advantageously, the urging means comprises two worm gears located on a cartridge shelf joined to the nailer, one gear engaging each side of the cartridge, both running parallel to the ribs, and both being driven by the same motor. In this way, neither gear will operate unless the whole of a nailed strip in the nailer has been cleared, but both gears will operate to move a new strip into the nailer, as will be explained in more detail below. In this way the new strip will be moved in a direction parallel to the ribs into the nailer.

The alignment means may comprise stepped abutments at either end of the apertured edge of the cartridge or on the cartridge shelf, but alternatively or additionally may comprise locking screws, spring clips or snap fit connectors.

Use of the automatic nailer of the invention ensures that at all times the alignment of the ferrule with respect to the machine, the nail and the substrate is as far as possible correct. Thus, it is possible to use such a machine to fix ferrules from a strip accurately onto items of joinery.

If a cartridge is used with a single hand held automatic nailer of the invention, it will be possible to carry out about 500 operations without refilling the machine. This could clearly increase the rate of fixing trims in a joinery operation.

However, it is envisaged that the production rate could be further increased by use of a number of automatically controlled nailers according to the invention.

For instance, it is envisaged that twenty four such nailers could be provided in a precise arrangement above a form for producing doors. By actuating a single switch which controls all twenty four devices simultaneously, it will be possible to position accurately all the necessary ferrules for the door trim in one operation. This clearly overcomes the problems referred to above.

Moreover, if each automatic nailer is provided with a cartridge, it would be possible to carry out one day's complete production with only one or two refillings of the nailers.

Although it is envisaged that the present invention will be of particular use in the joinery industry, it is by no means limited to such applications, and other areas of use will be readily apparent to a person skilled in the art. For instance, in the motor industry, various items of trim are fixed onto finished motor vehicles. The use of the machine and cartridge of the present invention may facilitate such trim fitting operations.

BRIEF DESCRIPTION OF THE DRAWINGS

FIG. 1 is an elevational end view of a prior art metal ferrule;

FIG. 2 is an elevational plan view of part of a strip according to the invention;

FIG. 3 is a sectional view taken generally along line 3—3 of FIG. 2 in the direction indicated;

FIG. 4 is an elevational view of the track of an automatic nailer according to the invention;

FIG. 5 is an elevational view of the guide plate of the automatic nailer;

FIG. 6 is a sectional view taken generally along line 6—6 of FIG. 5 in the direction indicated;

FIG. 12 is a partial side elevational view in partial section of the nailer of FIG. 7;

FIG. 12(*a*) is an enlarged side sectional elevation of a portion of FIG. 12 showing the hammer just prior to impact with te ferrule strip;

FIG. 12(*b*) is the portion of the nailer shown in FIG. 12(*a*) subsequent to impact of the hammer against the ferrule strip.

DESCRIPTION OF THE PREFERRED EMBODIMENTS

Figure 7:
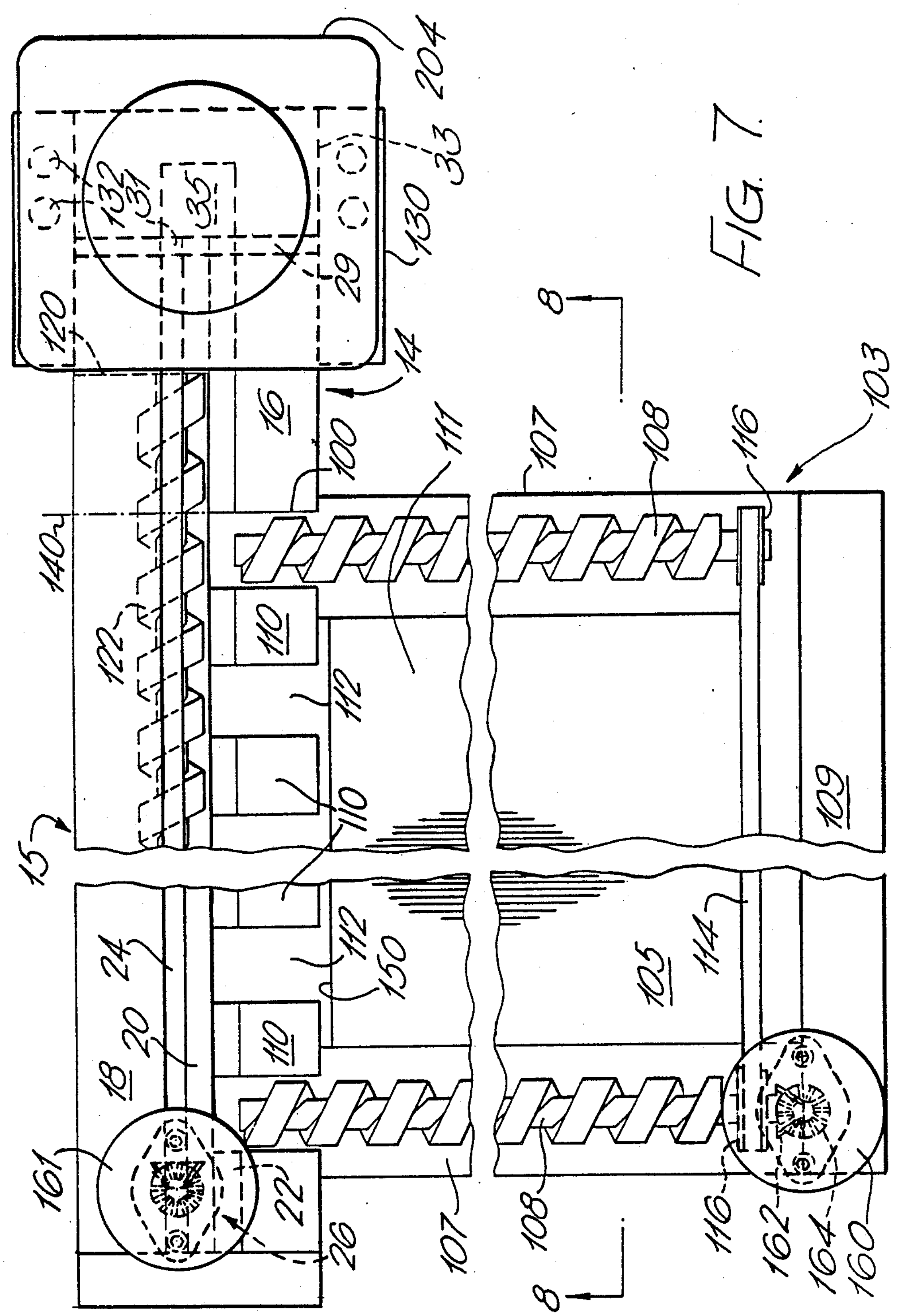
FIG. 7 is a elevational plan view of the track, guide plate, stop block of, and the cartridge shelf for the automatic nailer, with some parts removed for the sake of clarity.

Referring now to FIGS. 2 and 3, the strip 101 includes a number of plastic ferrules 5 connected by webs 7 of plastic. There are two webs 7 connecting each ferrule to its adjacent ferrule, the webs being located on opposite sides of the longitudinal axis of the strip. In this case the strip 101 and the webs 7 are made by injection molding using Nylon A 100 supplied by Warden Plastic Ltd. of Luton, Bedfordshire, United Kingdom as the plastic.

Each ferrule 5 is generally of square cross-section as seen from the direction of nail insertion 10 and has a step 9 running parallel to the webs 7 on either side of the ferrule 5. The edges of the thicker portion 11 of the ferrule 5 above the step 9 taper towards the end of the ferrule 5.

A countersunk 12 is formed centrally in the ferrule 5 in the direction of nail insertion 10. The smaller diameter part of the hole 12 tightly receives the shank of a T-head nail 80 (shown in FIG. 8). The T-head of the nail 80 fits tightly into the larger diameter part of the hole 12. In use, therefore, the nail 80 is fixedly located in the ferrule 5.

Referring now also to FIGS. 4 to 13, there are shown various parts of an automatic nailer and cartridge according to the invention. In general, the nailer 15 is constructed according to principles well known in the art, and it is therefore not necessary to describe most of the parts thereof further. However, in order to explain the present invention more clearly, those parts which are different from a conventional automatic nailer are described in detail herein.

Figure 11:
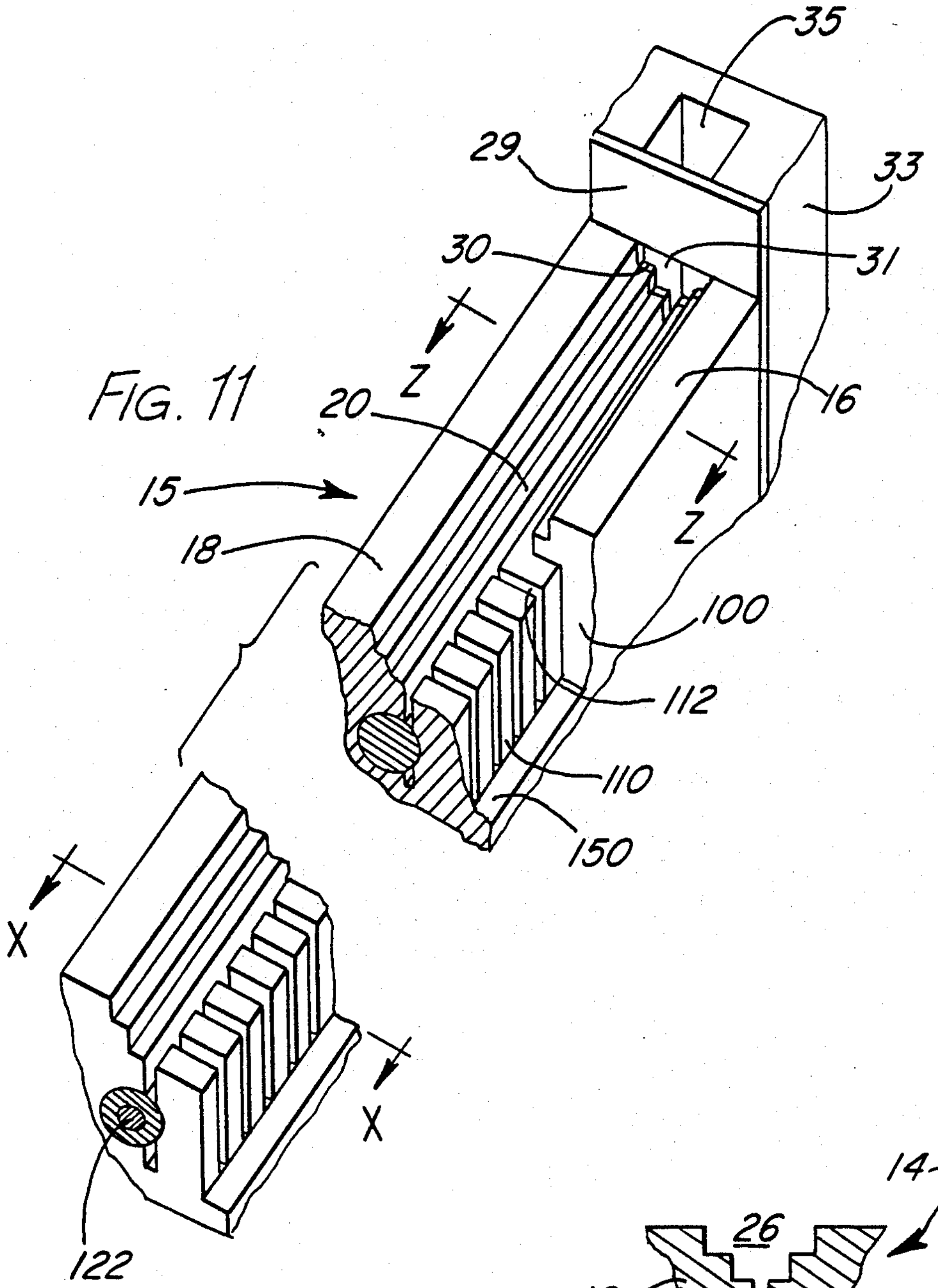
FIG. 11 is a partial perspective elevation of the nailer shown in FIG. 7.
Figure 11A:
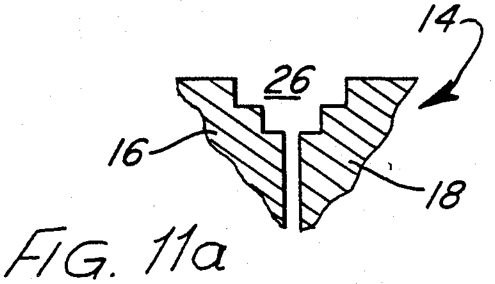
FIG. 11*a* is a sectional view taken generally along line Z—Z of FIG. 11 in the direction indicated.

The track 14 for the automatic nailer 15 is shown in FIGS. 4, 7 and 11, and comprises two members 16, 18 held in spaced apart parallel relation and defining an elongate opening 20 therebetween. The adjacent top corners of the members 16, 18 are so shaped as to form steps 22, 24 which co-operate to form a groove 26. In use, the bottom of the thinner portions of the ferrules 5 sit on the bottom of the groove 26 and the sides of the thicker portions 11 of the ferrules 5 are closely adjacent but not gripped by the side edges of the groove 26, which therefore constrains the ferrules to move in a rectilinear fashion. Part of the member 16 has been removed to leave an opening 100 for receiving a cartridge 102, shown in FIG. 8.

Figure 8:
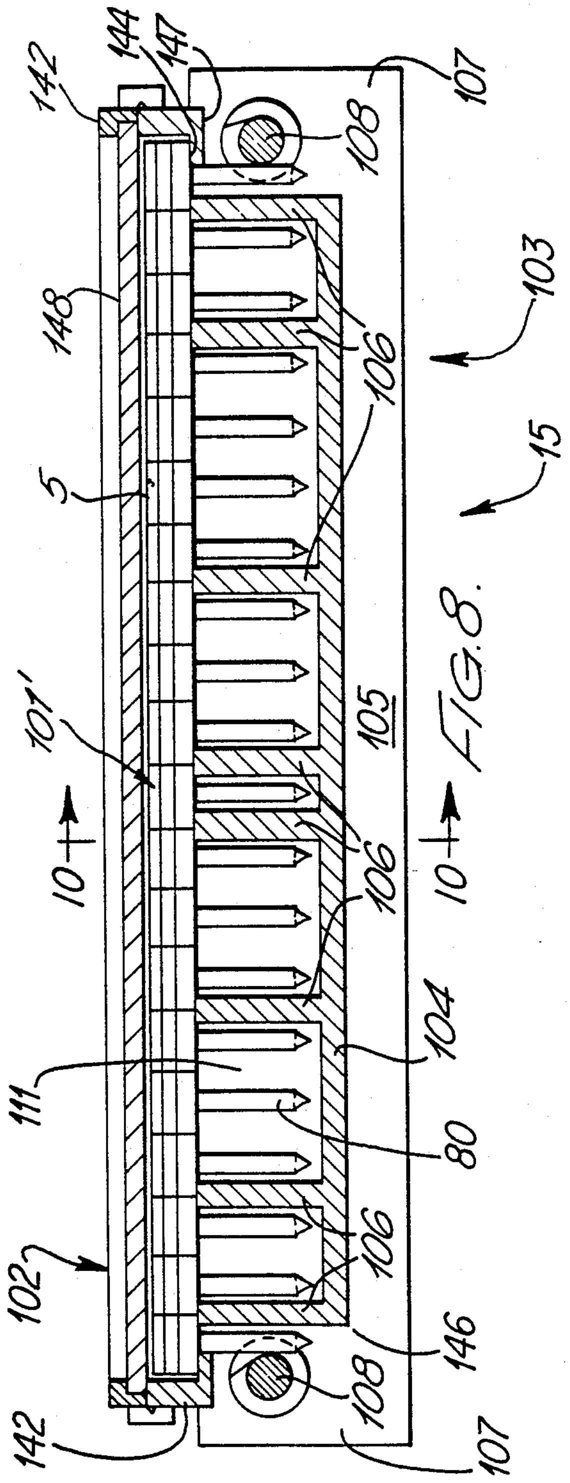
FIG. 8 is a sectional view taken generally along line 8—8 of FIG. 7 in the direction indicated, showing a cartridge in position and the drive motors deleted.

Referring now to FIGS. 7 and 8, a planar cartridge shelf 103 is integrally joined to the side of the nailer 15 adjacent the aperture 100. The shelf 103 is provided with a floor 105, two stepped side walls 107, and an end wall 109. In FIG. 7, the side walls 107 are partially removed. The side walls 107 and the end wall 109 create a recess 111 into which the cartridge 102 is inserted. Adjacent each side wall 107 is located one of a pair of worm gears 108 running parallel to each other and normal to the track 14. The worm gears 108 are mounted in conventional bearing blocks (not shown) for axial rotation therein.

Each side wall 107 is provided with a lower step 146 and an upper step 147 which, with the recess 111, provides a configuration into which the cartridge 102 is inserted as described below. The shelf 103 is also provided with a step 150 which facilitates the alignment of the cartridge 102 within the recess 111.

Figure 9:
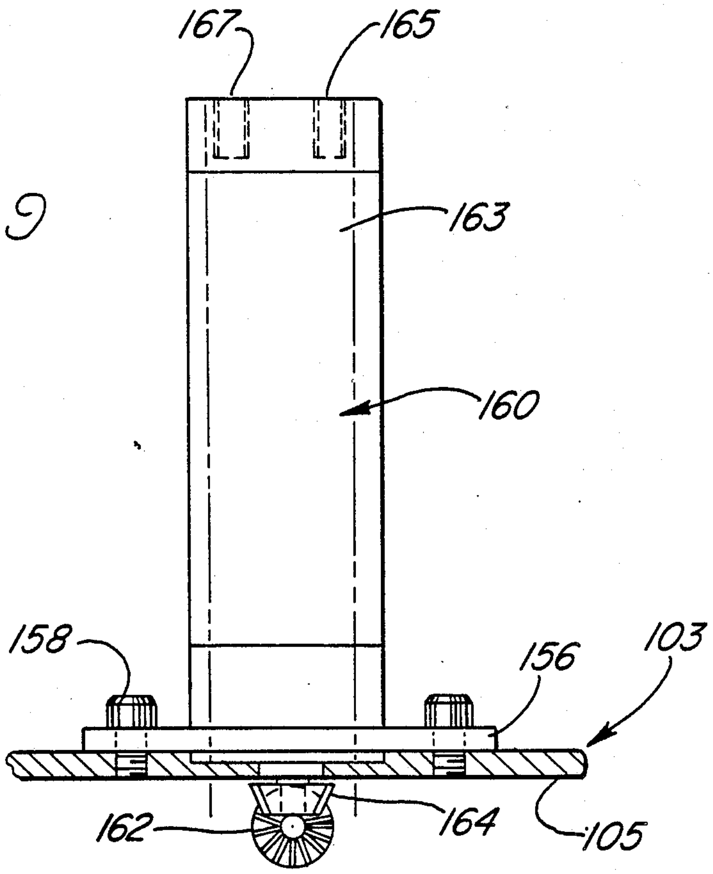
FIG. 9 is an elevational plan view of a motor for the nailer shown in FIG. 7.

The worm gears 108 are both driven by a belt 114 and pulley 116 arrangement from a common drive pulley and pneumatic motor 160. The motor 160 is preferably a low revving (approximately 33 rpm), low power (approximately 0.12 HP) pneumatic air motor of the type well known in the art. Referring to FIG. 9, the motor 160 has a housing 163 with an air inlet 165 and an exhaust inlet 167, and is mounted to the underside alternatively to the top side of the shelf 103. A mounting flange 156 is secured to the floor 105 or the top side of the shelf 103 by threaded fasteners 158. The motor 160 drives the worm gears 108 by means of a pair of pinion gears 162, 164. The motor 160 is of low power so that, in use, when there is a nailed strip 101' (shown in FIG. 8) in the groove 26 to the left of line 140 (shown in FIG. 7), and a nailed strip 101' in the cartridge 102 abuts against the nailed strip 101' in the groove 26, the motor 160 stalls, and therefore neither of the worm gears 108 turns. Thus, the worm gears 108 will only turn to feed nailed strips 101' into the groove 26 when the whole of the previous nailed strip 101' has moved to the right of line 140 as shown in FIG. 7.

The cartridge shelf 103 is also provided with a plurality of abutments 110 located in the aperture 100, and having the same cross section as the member 16. The abutments 110 are spaced to allow nail-bearing ferrules 5 to pass therebetween. Alternatively, the cartridge 102 may be provided with abutments performing a similar function.

Referring now to FIG. 8, a cartridge 102 is shown located in operating position upon the cartridge shelf 103. The cartridge 102 is provided with a configuration resembling an elongate flattened box. The cartridge 102 has a base plate 104 to which is integrally joined a plurality of vertically projecting ribs 106 which run parallel to each other and to the worm gears 108, and run the length of the cartridge 102. The ribs 106 support a plurality of nailed strips 101', each of which is positioned transversely across the ribs 106.

Although in FIG. 8 some detail has been omitted for purposes of illustration, each strip 101' includes a plurality of ferrules 5 connected in spaced relationship by a web 7, as disclosed in FIG. 2. In addition, each ferrule 5 is provided with a nail 80 inserted therein. The outermost ribs 106 are located so that in use, nails 80 depending from the outermost ferrule 5 in a strip 101' are outside the end ribs 106 and can mesh with the worm gears 108, as shown in FIG. 8. Each cartridge 102 may contain on the order of 25 strips 101', each strip having approximately 20 nailed ferrules 5.

The ribs 106 are aligned upon the base plate 104 of the cartridge 102 to correspond to the abutments 110 of the shelf 103, and as such, to facilitate the passage of depending nails of strips 101' therebetween. The cartridge 102 is open at the end adjacent the aperture 100 to permit this passage of nailed strips 101'.

The cartridge 102 is also provided with a pair of 'L' shaped side walls 142, each with an inwardly projecting lip 144. The lips 144, and the bases of the outermost ribs 106, engage steps 146, 147 in the shelf side walls 107 to place the cartridge 102 in proper registry with the shelf 103. Conventional spring clips or other suitable fastening means (not shown) secure the cartridge 102 to the shelf 103.

The cartridge 102 has a lid 148 located to retain the strips 101 in alignment upon the ribs 106, while permitting the strips 101' to slidably move toward the track 14.

Figure 10:
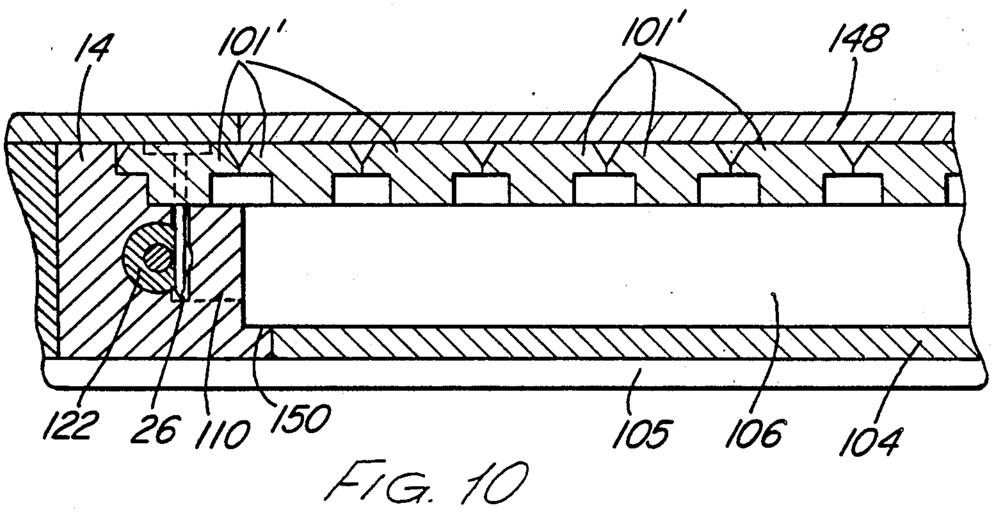
FIG. 10 is a sectional view taken generally along line 10—10 of FIG. 8 in the direction indicated.

Referring now to FIG. 10, alignment between the cartridge 102 and the abutments 110 and the track 14 of the nailer 15 is shown. The rib 106 is in contacting engagement with the adjacent abutment 110. As the strips 101' reach the end of the rib 106, they are passed to the abutments 110 then into the grove 26 of the track 14.

The track 14 also has in it a second opening 120 in which is located the feed worm gear 122. The feed worm gear 122 is driven by a low power pneumatic feed motor 161 (seen best in FIG. 7) and is arranged to mesh with the nails 80 depending from a nailed strip 101' located in the groove 26. The feed motor 161 is substantially identical to the motor 160, and is also mounted to the shelf 103 in similar fashion to the motor 160 as shown in FIG. 9.

Referring to FIG. 7, in use, the feed motor 161 will cause the feed worm gear 122 to move a nailed strip 101' towards a stop block 33 (described in more detail below) at the end of the track 14. As soon as the end ferrule 5 of a strip 101' is located in the stop block 33, the feed motor stalls. Therefore the feed worm gear 122 can only operate to move a ferrule 5 in a nailed strip 101' into the stop block 33 after a previous ferrule 5 has been cleared from the stop block 33.

The guide plate 29, which is shown in FIGS. 5, 6, 7, 11 and 12, is an elongate generally rectangular plate having in it a T-shaped slot 31. The plate 29 is fixed so that it abuts the track 14 with the bottom edge of the arms of the T aligned with a bottom of the groove 26, and the leg of the T aligned with the opening 20. The head of the T is the same shape as but marginally larger than a ferrule 5. As shown in FIG. 6, the bottom edges 30 of the arms of the T-shaped slot 31 are sharpened, for reasons which will become apparent below.

The stop block 33 of the nailer is shown in FIGS. 7, 11 and 12, and is located immediately adjacent the guide plate 29. If desired the block 33 may be fixed onto or integral with the plate 29. The block 33 has formed in it an elongate recess 35, which together with guide plate 29 defines a path along which a ferrule 5 may be driven. The recess 35 extends in the direction of nail insertion 10.

The guide plate 29 and block 33 extend the same length below the track 14, and, in use, their bottom edges will abut a location plate 130 (shown in FIG. 7)

which, in use will lie flat on the substrate into which the nail is to be driven. Therefore the ferrule 5 will be guided by the recess 35 all the time it is being moved by the nailer, thus ensuring that it is correctly oriented. The location plate 130 includes holes 132 which may be used to align the device on the substrate.

Figure 13:
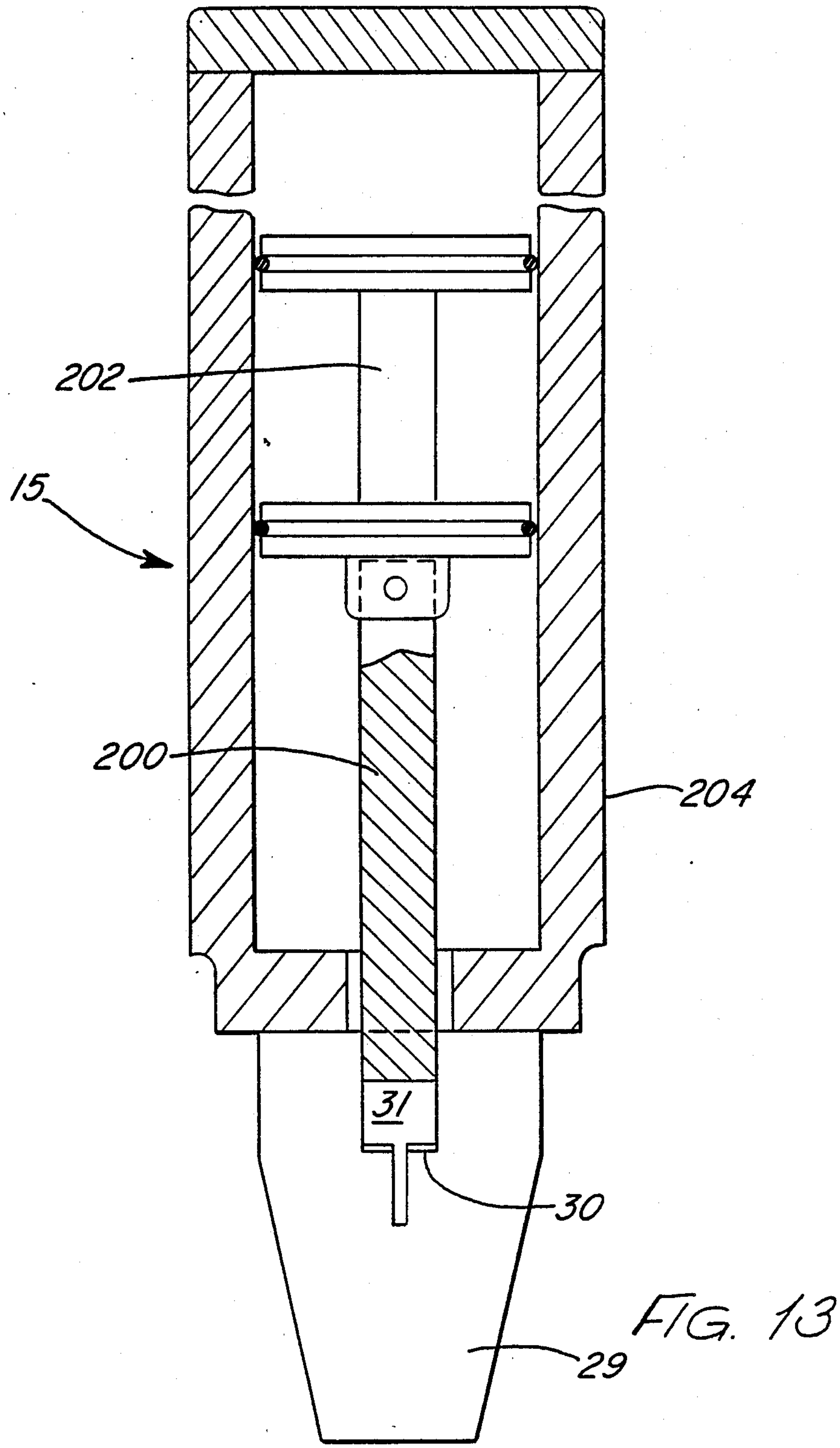
FIG. 13 is a front elevation, in partial section, of the nailer shown in FIG. 12.

Referring now to FIGS. 12 and 13, the hammer 200 of the automatic nailer 15, is actuated by a hydraulic or pneumatic piston 202, has the same cross-sectional shape as the recess 35, thus ensuring that the hammer 200 impacts squarely on the nail, further ensuring the correct alignment of the ferrule 5 on the substrate. The hammer 200 and the piston 202 are located within a housing 204. The entire assembly is well known in the profession and is an adaptation of model HLB 1516 of Spot Nails Limited, Unit 37, Portmanrush Road, Cardiff, CF2 24B, Wales, United Kingdom.

In use, a number of strips 101 of the type shown in FIGS. 2 and 3 have T-head nails 80 inserted into the holes 12. The filled strips 101' are then located on the ribs 106 of the cartridge 102 with the shanks of the nails depending into the spaces between the ribs 106.

The nails 80 in the end ferrules 5 of each strip 101' mesh with the worm gears 108. The cartridge 102 is inserted into its opening 100 in the track 14 and upon the shelf 103 and pneumatic power is supplied to the motors 160, 161. Since initially there is no strip 101' in the groove 26, both the worm gears 108 and the feed worm gear 122 rotate.

The movement of the worm gears 108 causes all the nailed strips 101' in the cartridge 102 to move towards the track 14, pushing the first strip 101' into the groove 26, with the nails 80 passing through the openings 112 between the abutments 110. During this movement, all the strips in the cartridge remain aligned parallel with the groove 26 in the track 14, thereby ensuring correct feeding of the strips 101'. As soon as the first strip 101' is located in the groove 26, movement of the remaining strips is prevented, and the motor 160 stalls.

The nails 80 in the first nailed strip 101' now located in the groove 26 mesh with the feed worm gear 122 and the strip is moved towards the stop block 33. As soon as the first ferrule 5 abuts the stop block 33, further movement of the strip 101' is prevented, and the feed motor 161 stalls. Thus the strip 101' is fed in a straight line into the stop block 33, but further movement is prevented until the ferrule 5 in the stop block 33 has been removed.

Referring to FIGS. 12*a* or 12*b*, when the end of the strip 101 abuts the stop block 33, one ferrule 5 with its associated nail 80 is located in the recess 35, and the webs 7 connecting the ferrule to the next adjacent ferrule are located above the bottoms 30 of the arms of the T-shaped slot 31 (shown in FIGS. 5 and 6).

When the hammer 200 is actuated by firing the nailer 15 in conventional fashion, it impacts the head of the nail 80, causing the nail 80 and the ferrule 5 to move along the recess 35. The webs 7 are brought into contact with the sharpened edges of the bottoms 30 of the arms of the T-shaped slot 31, cutting the webs 7 and allowing the ferrule 5 to severed from the next adjacent ferrule 5. The ferrule 5 and its nail 80 are then driven further along the recess 35 to force the nail 80 into a substrate (not illustrated) and to locate the ferrule 5 accurately thereon.

When the hammer 200 is withdrawn, the feed motor 161 begins to operate again and movement of the feed worm gear 122 causes the next adjacent ferrule 5 to be moved into the recess 35, and the cycle can be carried out again.

As soon as the end of the last ferrule 5 in the first strip 101' has passed to the right of line 140 shown in FIG. 7, there is no resistance to movement of the next strip into the groove 26. The motor 160 therefore starts again, causing the next strip 101' to be moved into the groove 26 by worm gears 108. In this manner all the strips 101' in the cartridge 102 can be moved into the automatic nailer 15, which can therefore deliver up to 500 nails and ferrules without the need for it to be refilled.

It will be of course be understood that the present invention has been described above purely by way of example, and modifications of detail can be made within the spirit and scope of the invention.

What is claimed:

1. A strip, for use with an automatic nailer, comprising a plurality of plastic ferrules, arranged in a longitudinal row, for receiving a complementary plurality of nails, each ferrule being attached to adjacent ferrules by at least one severable plastic web, each ferrule provided with means whereby a trim can be fixed onto a substrate onto which the ferrule has been attached, the fixing means including a step in the ferrule which is adapted to co-operate with a surface of the substrate to form a groove for receiving a flange on the trim and the thicker part of the stepped ferrule is tapered to assist in fitting the trim.

2. The strip of claim 1 wherein the ferrules are arranged in a rectilinear row.

3. The strip of claim 1 wherein each ferrule is generally square in plan and has a central axial hole for receiving its nail.

4. The strip of claim 1 including two webs between adjacent ferrules, the webs being located on either side of the longitudinal axis of the strip.

5. The strip of claim 1 wherein said ferrule and said web are made from polyamide or polypropylene.

6. The strip of claim 5 wherein said ferrules and said web are molded into an integral unit.

7. The strip of claim 1 including a nail selected from the group consisting essentially of panel pins, tacks, oval head nails, T-head nails, masonry pins, expansion bolts and expanding nails, located in each ferrule.

8. The strip of claim 7 wherein the ferrules and the webs have been formed around the head of the nails in a molding operation.

* * * * *